July 30, 1935.  J. L. SHROYER  2,009,790
COOKING APPARATUS
Filed April 13, 1931  2 Sheets-Sheet 1
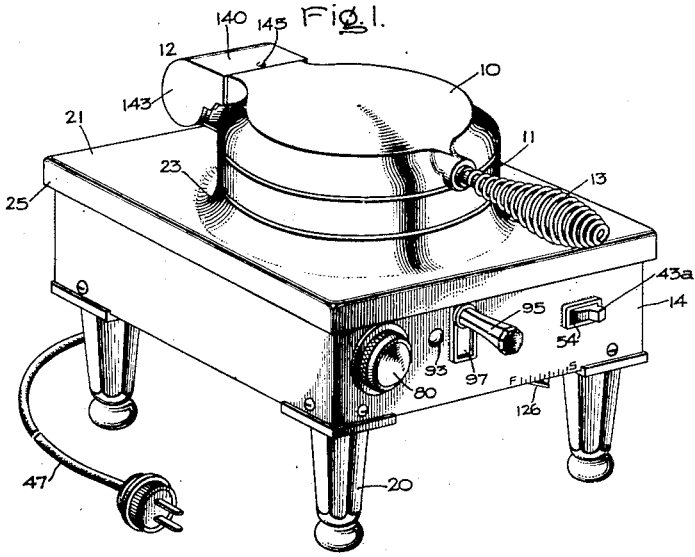
Inventor:
Jacob L. Shroyer;
by Charles N. Mullen
His Attorney.

July 30, 1935.  J. L. SHROYER  2,009,790
COOKING APPARATUS
Filed April 13, 1931   2 Sheets-Sheet 2
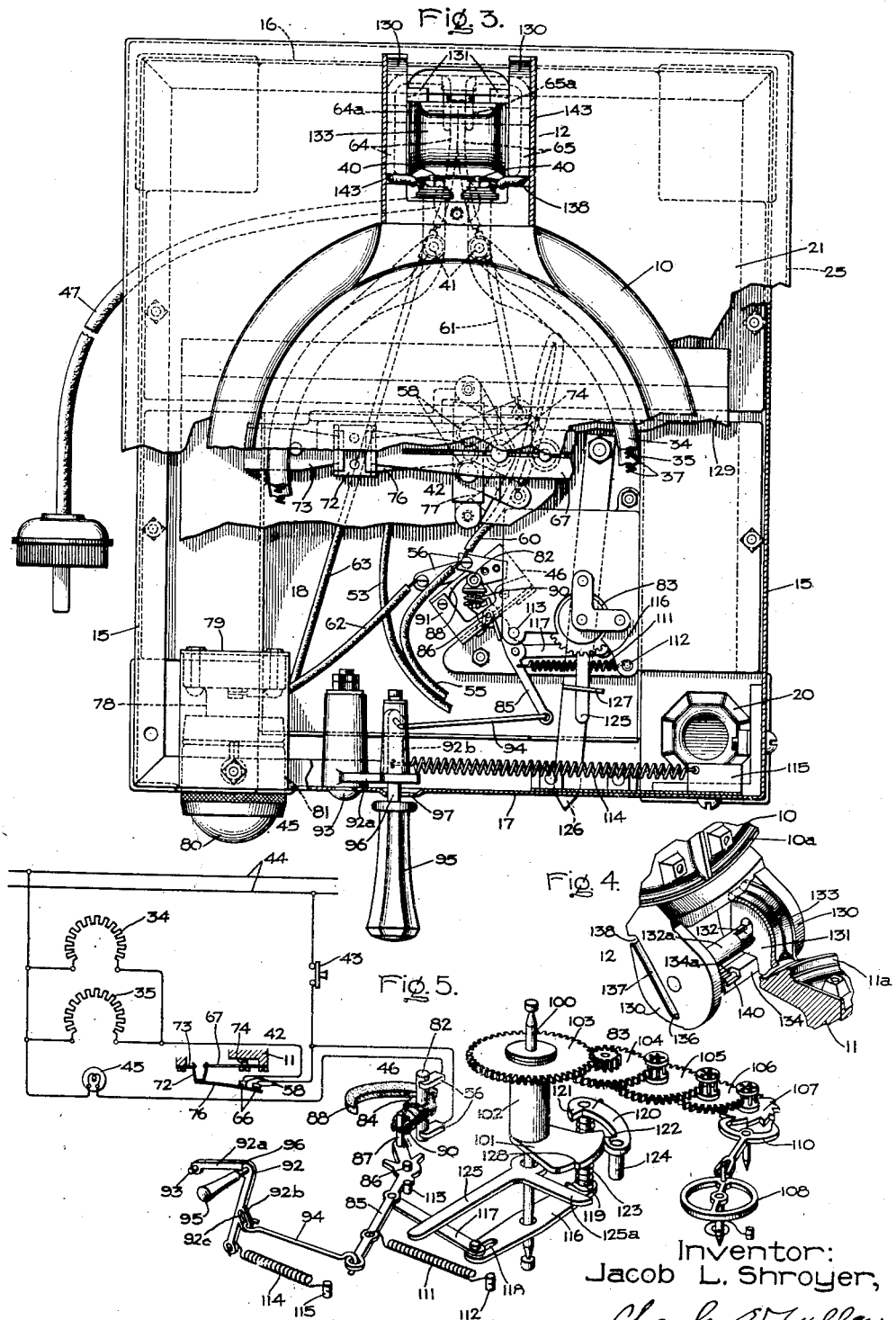
Inventor:
Jacob L. Shroyer,
by Charles V. Tullar
His Attorney.

Patented July 30, 1935

2,009,790

UNITED STATES PATENT OFFICE 2,009,790

COOKING APPARATUS

Jacob L. Shroyer, Oak Park, Ill., assignor to Edison General Electric Appliance Company, Chicago, Ill., a corporation of New York Application April 13, 1931, Serial No. 529,654

6 Claims. (Cl. 219—19)

My invention relates to cooking apparatus, more particularly to electric cooking apparatus provided with a cooking plate or plates for effecting baking and like operations, and has for its object the provision of an improved device of this character.

Although my invention is not limited thereto, it has special application to electric cooking apparatus provided with opposed electrically heated cooking plates, such as waffle irons, and it has for a further object the provision of improved means for accurately controlling the temperatures of the cooking plates; and further, the provision of means for measuring cooking periods in accordance with the temperatures maintained in the plates so that the cooking operations can be precisely duplicated with the result that a superior, uniformly cooked product is obtained.

My invention further contemplates the provision of improved hinge means for connecting the cooking plates, and for receiving the electrical conductors passed between the plates, whereby the conductors are concealed and thus protected from foreign matters, such as batter, etc., and also relieved from excessive mechanical strains.

In carrying my invention into effect in one form thereof, I provide suitable temperature responsive means, preferably arranged to operate in accordance with the temperature of the lower heating plate, for controlling the heating elements provided for both of the plates so as to maintain substantially constant cooking temperatures. Suitable time element signal means are provided for measuring cooking periods whereby the cooking operations can be accurately duplicated.

I further provide suitable hinge means connecting the plates, the hinge means being provided with passageways therein through which the electrical conductors between the plates are directed, and with means for securing a portion of each of said conductors whereby they are relieved of excessive strains.

For a more complete understanding of my invention reference should be had to the accompanying drawings in which Fig. 1 is a perspective view of an electric waffle iron embodying my invention; Fig. 2 is a vertical central sectional view of the waffle iron of Fig. 1; Fig. 3 is a plan view partly in section and with portions broken away so as to illustrate certain structural details; Fig. 4 is a fragmentary view illustrating a hinge connecting the cooking plates of the waffle iron of Fig. 1 arranged in accordance with my invention; and Fig. 5 is a diagrammatic view illustrating the heating circuits and the time element signal means arranged in accordance with my invention.

Referring to the drawings, I have shown my invention in one form in connection with an electric waffle iron comprising upper and lower heating or cooking plates 10 and 11 pivotally connected together at one edge by means of a hinge 12 whereby the upper plate can be rotated on the lower plate. These two plates are preferably cast from a suitable metal having a good heat conductivity, such as aluminum. It will be understood that these plates form cooperating mold sections for the waffle batter. Preferably the heating plates will be provided with peripheral flanges 10a and 11a arranged to cooperate so as to provide a retaining wall for the batter. A handle 13 is suitably secured to the upper plate whereby this plate can be conveniently moved between its heating and open positions.

The heating plates are supported on a suitable base 14 comprising walls defining a suitable rectangular closed casing. As shown, this casing has a pair of side walls 15 (Fig. 3), an end wall 16, a front wall 17 and a bottom wall 18, these walls preferably being formed from a suitable sheet metal, such as steel. The base 14, as shown, rests on suitable legs 20 forming supports for the waffle iron.

The top wall 21 of this casing, as shown, is provided with a comparatively large circular aperture 22 surrounded by an upturned flange 23. The lower cooking plate as shown rests on the flange 23, the lower end portion of the plate being slightly reduced in diameter and received in the opening 22.

The upper wall 21 of the casing, as shown, is provided with a peripheral flange 25 bent downward substantially at right angles to the main body of the wall; as will be observed the edges of the top wall project somewhat beyond the corresponding sides of the vertical walls of the casing so that this flange 25 overhangs somewhat. The top wall is secured to the vertical walls of the casing by means of mounting brackets 26 which are secured to the flange 25 in any suitable manner, as by welding, and to a flange 27 projecting inwardly from the vertical walls of the casing in a horizontal direction by means of screw fastening means 28.

The top wall 21 is provided with mounting brackets 30 (Fig. 2) for securing the heating plates. These brackets extend crosswise of the heating plates so that portions are received by the opening 22, and are secured at their ends to the under surface of the top wall in any suitable manner, as by welding. The heating plates are secured by means of screws 31 passed upwardly through apertures provided for them in the brackets and received in threaded engagement in the lower heating plate 11. Preferably lock washers 32 will be arranged between the heads of the bolts and the brackets.

The cooking plates 10 and 11 are heated by means of electrical heating elements 34 and 35 which, as shown, are cast in the metal forming the plates. While any suitable electric heating elements may be used, I prefer to use a "sheathed wire" element, such as described and claimed in United States Patent No. 1,367,341, granted to C. C. Abbott, dated February 1, 1921. Briefly, this unit comprises an outer metallic sheath 36 in which a helically shaped resistance wire 37 is embedded in a compacted, powdered, heat refractory, electrically insulating material 38, such as magnesium oxide. It will be understood that these units can be bent easily into any desired shape.

The elements 34 and 35, as shown in Fig. 3, are bent in substantially circular form, and it will be understood to such a diameter that each heating element will have a proper position with respect to the periphery of its plate 10, 11 to give a substantially even distribution of heat throughout the cooking plates. Preferably, the heating element for the lower plate will have a capacity slightly higher than that of the upper heating element so as to compensate for the heat losses by conduction from the lower plate. This difference in capacity will be such that the plates will be maintained at substantially the same temperature.

The terminals 40 of the upper heating element are arranged adjacent each other, as shown (Fig. 3), and are brought out or project from the plate 10 at the rear or hinge side of the plate and substantially in the plane of the heating element. Likewise, the terminals 41 of the lower element are brought out of the plate 11 at its hinge side. It will be observed, however, that the end portions of the lower element 35 are turned downwardly substantially at right angles to the intermediate curved portion of the element and project with their terminals into the casing 14.

The heating elements 34 and 35 are provided with suitable control means including a temperature responsive device 42 and a main control switch 43 interposed in the connections leading from a suitable source of electrical supply 44, shown diagrammatically in Fig. 4. In order to measure the baking periods in accordance with the temperatures maintained in the cooking plates, a suitable signal device comprising a pilot lamp 45 and a time element controlling switch 46 therefor is provided.

The heating elements 34 and 35 are connected in parallel, as shown, diagrammatically in Fig. 4, and connected in parallel with these elements is arranged the pilot lamp 45.

External electrical connections for the two heating elements and pilot lamp shown as a twin supply conductor 47 are brought in at the lower wall 18 of the casing 14 through a bushing 48 formed of a suitable electrically insulating material, such as porcelain. This bushing is received by a threaded member 50 provided for it in the bottom wall. As shown, a knot 51 is formed in the cord above the bushing to prevent any possibility of damage or strain to the mechanism within the casing by accidentally pulling on the cord.

One conductor 52 of this twin supply conductor is connected directly with one of the terminals 41 of the lower heating element, while the other conductor 53 of the supply conductor is connected with one terminal of the main control switch 43. This switch preferably will be of the toggle type and will be mounted within the casing and on its front wall 17. The operating member 43a of this switch is passed through a suitable aperture 54 provided for it in the front wall of the casing to the exterior of the casing where it may be conveniently operated. The other terminal of the toggle switch 43 is connected by means of a conductor 55 with one of a pair of fixed contacts 56 provided on the time switch 46 and from this contact with one of a pair of fixed contacts 58 provided on the thermostat 42 by means of a conductor 60. The remaining fixed contact 58 of the thermostat is connected by a conductor 61 with the second terminal 41 of the lower heating element 35, while the remaining fixed contact 56 of the timing switch is connected by means of a conductor 62 with one side of the pilot lamp 45. The other side of this lamp is connected with the first terminal 41 of the lower heating element by means of a conductor 63. The two heating elements 34 and 35 are connected in parallel by means of a pair of conductors 64 and 65 which are passed between the heating plates and are electrically connected with the terminals 40 and 41.

It will be observed that by reason of the foregoing electrical connections, the two heating elements 34 and 35 are connected in parallel, and the pilot lamp 45 is connected in parallel with the heating circuit. It will also be observed that the heating elements are controlled by means of the thermostat 42 independently of the signal lamp circuit, while the signal lamp circuit is controlled by the timing switch independently of the heating circuit; and also that the toggle switch 43 is arranged to control both of the energizing circuits provided for the heating elements and pilot lamp.

The temperature responsive device 42 for controlling the heating elements 34 and 35 to maintain substantially constant temperatures in the heating plates 10 and 11, preferably will be of the form described and claimed in United States patent No. 1,743,073 granted to A. H. Simmons, dated January 7, 1930, although it will be understood that any suitable thermostat may be used. Briefly, this thermostat comprises the above-mentioned fixed contacts 58, a pair of movable contacts 66 for bridging the fixed contacts and a temperature responsive element 67 for actuating the movable contacts. The temperature responsive element 67 comprises a bimetallic bar formed of two strips of metals having dissimilar temperature coefficients of expansion, such as invar and Monel metal, securely brazed or welded together lengthwise. The bar 67 is rigidly secured at one end by means of screws (not shown) to the lower surface of the bottom plate 11 and extends crosswise of the plate and in substantially parallel relation with it. Preferably, the bar 67 will be positioned between a pair of substantially parallel walls 67a arranged on and depending from the lower plate 11. These walls protect the bar from air currents and reduce the temperature gradient between the plate 11 and the bimetallic bar. The free end of the thermostat bar bears on one arm of a U-shaped spring member 72, the other arm of which is seated on a fixed knife-edge bearing 73, which bearing is secured in any suitable manner, as by means of screws, to the under surface of the heating plate. A temperature adjustment rod or shaft 74 is provided to cooperate with the thermostat bar 67 whereby the temperature maintained in the heating plates can be varied.

Secured to the base portion of the spring member 72 is a spring contact member 76 on the free end of which are carried the bridging contacts 66. As shown, the bridging contacts cooperate with the fixed contacts 58 so that when the contacts are in engagement the electrical circuit through the thermostat is closed, whereas when the contacts are out of engagement the circuit through the thermostat is open. A suitable stop member 77 is provided for the bridging contacts when in their open circuit position.

It will be understood that the U-shaped spring member 72 serves to snap the thermostat bar 67 quickly between its two operating positions and thus to quickly open and close the switch contacts 58 and 66.

In the operation of the waffle iron thus far described, it will be understood that the bridging contacts 66 are held in engagement with the fixed contacts 58 to maintain the heating circuits closed as long as the temperatures of the heating plates 10 and 11 are below a predetermined maximum value. Upon the occurrence of a predetermined maximum temperature the thermostat moves the contacts quickly apart to open the heating circuit. After the heating circuit has been opened and the temperature of the heating plates, and consequently the temperature of the thermostat, begins to decrease the thermostat bar tends to move it back to its closed position until finally upon the occurrence of a predetermined minimum temperature, the thermostat will snap to quickly close its switch contacts. In this manner the heating circuits are controlled so as to maintain a predetermined heating plate temperature which is a mean between the maximum and minimum temperatures for which the thermostatic device is set to operate.

As has been pointed out previously, suitable time control signal means for measuring cooking periods is provided; this means, as has also been pointed out, comprises a pilot lamp 45 together with a time element switch 46 for controlling it. The lamp 45 is provided with a suitable socket 78 mounted in the casing 79 behind the front wall 17. This wall is provided with a circular opening in which is fitted a suitable glass lens 80 which preferably will have some suitable color such as red. This lens is supported by means of a cylindrical-like member 81 arranged back of the lens opening and in front of the lamp socket 78.

The timing switch 46 for controlling the pilot lamp, as shown, is supported on the bottom wall 18 of the casing 14. This switch comprises the above-mentioned fixed contacts 56, a cooperating bridging contact 82 for controlling an electrical circuit through the switch and a timing clock-work mechanism 83 controlling the motion of the bridging contact 82.

The bridging contact 82 is mounted on a suitable insulating supporting member 84 which is carried on one end of an arm 85 pivotally mounted on a fixed pivot member 86. The member 84 is forked at one end to receive an actuating pin 87 carried on one end of the arm 85, and is biased away from the pin toward an insulating stop and guide member 88 by means of a suitable compression spring 90. The stop member, as shown, is curved at one end, its left hand end as viewed in Fig. 5, so as to provide a stop for the bridging contact 82 when in their open circuit position. This member is also curved so as to guide the contact 82 to the fixed contacts 56 to close the switch. This member 88, as shown in Fig. 3, is mounted in a suitable supporting framework 91, which also serves to support the fixed contacts 56 and the fixed pivot 86 provided for the arm 85. It will be observed that the mechanism thus far described constitutes a toggle switch which operates to its open and closed circuit positions with a snap action.

The switch is opened manually by means of an operating member 92. This member is of angular form so as to provide two lever arms 92a and 92b, as shown diagrammatically in Fig. 5. The end of the arm 92a is fixedly pivoted by means of a pin 93 to the front wall 17 of the casing; the other arm 92b is connected, preferably at a point intermediate its ends, to the free end of the lever 85 by means of a link 94. Preferably, a slotted connection 92c will be provided between the arm 92b and the link 94. The lever 92 is provided with a handle 95 accessible on the exterior of the casing whereby the operator can conveniently operate the switch. This handle, as shown, is connected to the lever 92 by means of a pin 96 passed through a vertical slot 97 provided for it in the front wall of the casing.

The bridging contact 82 is moved to its closed circuit position a predetermined interval of time after it is moved to its open circuit position by means of the clock-work mechanism 83 which is rendered effective by the operation of the lever 92 in opening the switch. In other words, the lever 92 performs two functions, viz., to operate the switch to its open circuit position and at the same time to render the timing mechanism effective to thereafter close the switch.

The timing mechanism comprises a timing spindle 100 on which is mounted a cam 101. This cam is formed with a sleeve 102 bearing on the spindle to provide a friction connection therewith whereby under certain conditions of operation the cam may be rotated independently of the spindle while under certain other conditions of operation it will rotate with the spindle. Mounted on the spindle to rotate with it is a gear 103; this gear is connected through a gear train, comprising gear wheels 104, 105 and 106, with the ratchet 107 of a suitable escapement mechanism. This mechanism, as shown, further comprises a balance wheel 108 and an escapement 110, the arms of which cooperate with the escapement teeth of the ratchet 107.

The energy for driving the clock-work mechanism is provided by means of a spring 111 (Figs. 3 and 5). The spring 111 is a tension spring having its one end connected to the lever 85 intermediate its pivot and the end which is connected to the lever 92, and its other end connected with a member 112 fixed to the casing. This spring member, as shown, biases the lever arm 85 in a counterclockwise direction, as viewed in Fig. 5, toward a suitable stop 113 arranged on the bottom wall of the casing. A second tension spring 114 is arranged to operate the lever 92 in a counter-clockwise direction under certain conditions of operation, as will be pointed out hereinafter in more detail. This spring has one end connected with the lower end of the lever arm 92b and its other end connected with a fixed member 115 (Fig. 3) secured to the front wall 17 of the casing.

The mechanical connection between the common operating lever 92 and the clock-work mechanism comprises a lever 116 rotatably mounted on the winding spindle 100. One end of this lever is connected by a link 117 with the switch lever 85 at a point between the pivots 86 and the point of connection of the spring 112; this link 117 preferably will be connected with the lever 116 by a slotted connection 118 providing for limited movement of the connected end of the link longitudinally of the lever 116.

Mounted on the other end of the lever 116 is an upright pin 119 on the upper end of which is rotatably mounted a pawl-like member 120 arranged at its opposite ends with teeth 121 and 122. These teeth cooperate with the cam 101. As shown, the pawl-like member 120 is biased in a clockwise direction, as viewed in Fig. 5, that is, in a direction toward the cam, by means of a suitable spring 123 mounted on the pin 119.

The pawl member, as shown, is provided on its free end with a depending pin-like member 124. A suitable adjustable lever 125 is arranged on an axis substantially coincident with the axis of the timing spindle and is provided with an arm 125a to cooperate with the pin-like member 124 to adjust the timing periods, as will be more fully explained hereinafter.

The timing adjustment lever 125 is provided with an operating lever 126 pivotally mounted on the bottom wall of the casing at a point back of the timing mechanism; this lever is extended so as to project forwardly of the front wall 17 whereby it is accessible on the exterior of the casing. This lever is provided with a slotted arm 127 in which is received the lever 125. It will be observed that by reason of this arrangement a relatively small arcuate movement of the lever arm 126 will impart a considerably larger arcuate movement to the lever 125. This is of advantage in that it is desirable that the control arm accessible to the attendant have a comparatively small range of movement.

In the operation of the timing mechanism, when the common operating member 95 provided for the contacts and clock-work mechanism is depressed the lever arm 92 will be rotated in a clockwise direction, as viewed in Fig. 5, which operation moves the lever 85 in a clockwise direction; this operation causes the toggle switch to snap to its left hand position to open the switch; this operation also moves the lever 116 in the clockwise direction whereby the tooth 122 of the pawl 120 engages the cam 101 and moves it in the same direction. As the arm 116 and pawl 120 are thus moved, the spring 123 operates to move the pawl in a clockwise direction on its pin 119 so that the tooth 122 falls behind a detent 128 provided on the cam. It will be understood that during this clockwise motion of the cam the sleeve 102 will rotate on the winding spindle 100, the latter being stationary.

The depressing movement of the handle 95 also tensions the springs 111 and 114 which thereafter will tend to return the various elements to their initial positions, shown in Fig. 5. The force exerted by the spring 114 tends to return the lever 92 to its upper position, while the force exerted by the spring 111 is transmitted to the link 117 and the arm 116 whereby the latter tends to rotate in a counterclockwise direction. Its motion in this direction, however, is retarded by the timing mechanism by reason of the fact that the tooth 122 of the pawl member 120 in engaging the detent 128 will lock the lever 116 with the timing mechanism through the cam 101; it will be understood that during this operation the frictional force between the spindle 100 and the sleeve 102 will be sufficient to lock the spindle and sleeve together. The timing mechanism will thus operate until the pin 124 of the pawl engages the arm 125a of the time adjusting lever 125. When this occurs the pawl will be moved outwardly to disengage the cam whereby the arm 116 will be released, and then quickly moved in a counterclockwise direction to its initial position by the tension spring 111. This operation snaps the bridging contact 82 to its closed circuit position, and the operating member 92 is returned by the spring 114 to its initial position with its operating member 95 at the upper end of the slot 97. By reason of the provision of the slot 92c between the arms 92b and 94, the return movement of the arm 92 to the initial position does not interfere with the movement of the arm 85. It will be understood that the above described operation may be repeated as often as is desired merely by depressing the operating handle 95.

To effect an adjustment of the timing period it is merely necessary to move the lever 126 which in turn moves the lever 125 to adjust the position of the stop arm 125a. Obviously, the adjustment of this stop arm controls the length of time that the clock-work mechanism will operate before the pin 124 engages the stop; consequently the adjustment of the stop arm controls the period of time that the switch will remain open after it has been moved to its open position by the operation of the handle 95.

The timing switch and pilot lamp are protected from excessive temperatures by means of a shield 129 interposed between them and the heating plates.

The hinge 12, as has been pointed out, serves to conceal and protect the conductors 64 and 65 passed between the heating plates, and further, to protect them from excessive strains. The hinge comprises a pair of spaced lugs 130 formed on the upper heating plate 10 and a pair of cooperating spaced lugs 131 formed on the lower heating plate and received, as shown (Fig. 4), between the spaced lugs 130. Preferably the lugs will be spaced a distance apart greater than the distance between the terminals 60 and 61 of the heating elements, and preferably will be so arranged on the heating plates that they will be positioned on opposite sides of the points where the terminals project. Each of the lugs 130, 131 is provided with an aperture for receiving a hinge pin 132. Preferably the apertures of the lower plate hinge lugs will be elongated in the vertical direction when the heating plate 11 is closed whereby the upper plate may move upwardly for a limited extent to allow for the expansion of the batter in baking.

The lugs 131 of the lower heating plate are joined by an arcuate shaped wall 133, which preferably is formed integrally with the lugs and the body of the plate as shown. This wall preferably extends through an arc corresponding to an angle of substantially 90°.

The pin 132 is surrounded by a sleeve 132a formed from some suitable electrically insulating material, such as porcelain. The conductors 64 and 65 as shown are directed upwardly from the terminals 61 of the lower heating element between the spaced hinge lugs and are coiled about the central portion of the sleeve 132a. One or more turns 64a, 65a of the conductors will thus be formed about the pin. From this central portion of the pin the conductors are separated and directed in opposite directions to the lugs which are provided with passageways for directing them to the terminals 40 provided on the upper heating plate.

As shown, the upper hinge lugs are joined by a member 134 which as shown is positioned on the side of the pin 132 opposite to that where the lugs join the plate 10. This member is provided with a passageway 134a extending throughout its full length, this passageway terminating at its ends in apertures 136 provided in the hinge lugs and connecting the inner and outer faces of the lugs. Suitable recesses 137 are provided in the outer faces of the lugs and connect the mouths of the apertures 136 with transverse recesses 138 which are provided in the lugs adjacent the plate 10 to connect the outer and inner faces of the lugs. The member 134 is provided substantially at its central portion with an aperture 140 opening into the passageway 134a. It is through this aperture that the lengths of the conductors 64 and 65 passed from their coiled portions 64a and 65a are directed and passed in opposite directions to the apertures 136 through which they are passed to the recesses 137; the conductors then are directed through these recesses to the recesses 138 through which they are returned to the inner faces of the lugs where they are connected with the terminals 40 of the upper heating element.

The member 134 engages the lower lugs, as shown in Fig. 4, when the upper plate is swung upwardly to limit the backward movement of the plate.

The hinge is completely covered by a pair of casing members 140 and 141 (Fig. 2). The upper member 140, as shown, is provided at its sides with ears 143 which completely cover the outer surfaces of the lugs 130 and is provided with an arcuate-shaped wall 144 connecting these ears; this wall extends through an arc corresponding to an angle of substantially 90°. This upper casing member is secured to the upper plate 10 to move with it by means of a screw 145. The casing member 141 is secured to the lower plate 11 by means of a screw 146 and also is provided with a curved or arcuate shaped portion 147 extending through an arc corresponding to an angle of substantially 90°.

It will be observed that by reason of the above described hinge arrangement the conductors passed between the plates are totally concealed whereby the admission of foreign matters is prevented; the passages for the conductors, together with the casing members 140, 141 completely enclose the conductors. It is to be noted that in all positions of the upper plate 10, the casing members completely enclose the hinge 12. When the upper plate 10 is moved to its open position the arcuate portions 144 and 147 merely fold one over the other, and when the plate 10 is in its heating position the free ends of the casings overlap. Furthermore, the provision of the passageways for carrying the conductors from the lower plate 11 to points close to the terminals 40 of the upper heating element insures against any tendency for movement of the conductors at the terminals which reduces a likelihood of loose connections and burning out at the terminals. Another advantage of this hinge arrangement is that it permits the using of relatively large conductors. Still another advantage is that the conductors are relieved against excessive strains by reason of the fact that the conductors are wound about the hinge pin; in other words, the stresses in the conductors which usually are set up by the opening and closing of the upper plate are reduced to a minimum.

In the operation of the waffle iron it will be understood that the toggle switch 43 will be operated to connect the heating element and the pilot lamp circuits with the source of supply, it being assumed that twin supply conductor 47 is plugged in a suitable supply plug. When the iron is cold the thermostat 42 will be closed to complete an energizing circuit for the heating elements; at this time the switch 46 also will be closed so as to complete an energizing circuit through the pilot lamp 45. Under these conditions, the resistance elements will begin to heat up and the pilot lamp will be lighted. Eventually the heating plates will be heated to the maximum temperature for which the thermostat is set to open the heating circuit, whereupon the thermostat will open this circuit; the thermostat will then operate in the manner previously described to maintain substantially constant predetermined temperatures in the cooking plates. The iron is then in condition to be used.

In order to cook a waffle, a suitable amount of batter will be poured into the mold, the upper plate will be closed and the arm 95 will be depressed. This operation of the arm will open the pilot lamp energizing circuit indicating that the cooking period has started, and will also render the timing mechanism effective to close the switch a predetermined interval of time thereafter. Upon the expiration of this period of time the timing switch will operate to close the pilot lamp circuit whereby the lamp will be lighted thereby indicating that the cooking period has been completed. It will be understood that the timing mechanism will be adjusted by its lever 126 in accordance with the heating plate temperatures maintained by the thermostat so as to insure a completely cooked product. After the attendant has thus been signalled that the cooking period has been completed the baked waffle will be removed. After this another waffle may be cooked in the manner described, its timing period being measured as before by the timing mechanism.

The combination of the temperature responsive device for maintaining substantially constant temperatures in the heating plates and the time element signal means for measuring the cooking periods is important because it insures a uniformly cooked product. The waffles are evenly browned and are more attractive and tasty.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. A waffle iron comprising upper and lower heating plates, heating elements carried by said plates for applying heat thereto, a pair of spaced vertically arranged hinge lugs carried by said upper plate, a pair of spaced vertically arranged hinge lugs carried by said lower plates cooperating with said first lugs, a pin directed between said pairs of lugs pivotally connecting said lugs so that said upper plate can be rotated on said lower plate, a pair of electrical conductors between said plates, said conductors being directed from said lower plate into the space between said two pairs of spaced lugs where they are coiled about said pin and a member provided with passageways for directing said conductors in opposite directions one to each of said lugs provided on said upper plate, said last named lugs being provided with passageways extending through them from their inner to their outer faces communicating with the passageways in said member and leading to points adjacent said terminals on said upper plate for directing said conductors to said terminals.

2. A cooking apparatus comprising a base, a heating member supported on said base, a heating element carried by said member arranged to apply heat to said member, electrical connections between said base and said member for connection with the terminals of said heating element, and hinge means connecting said member to said base comprising a pair of spaced hinge lugs on said base, a pair of spaced hinge lugs on said heating member cooperating with said lugs on said base, pin means pivotally connecting said lugs, means for directing said conductors from said base between said pairs of spaced cooperating hinge lugs, a member connecting the lugs on said heating member provided with a conduit and an aperture opening from said conduit to a point between said pairs of lugs and through which said conductors are directed to said conduit, said conductors passing in opposite directions through said conduit to said lugs on said heating member, said last-named lugs having passageways through them from their inner to their outer faces and with passageways in said outer faces communicating with said through passageways and terminating at points adjacent said terminals for directing said conductors to said terminals.

3. Cooking apparatus comprising opposed heating plates, electrical heating elements for heating said plates, electrical conductors between said heating elements, spaced hinge lugs secured to one of said plates, spaced hinge lugs on the other plate cooperating with said first lugs on the outer sides thereof, said second lugs being provided with recesses in their outer faces and with conduits between said recesses and their inner faces, said conductors being carried through said conduits and recesses, and cover members normally closing said recesses.

4. A waffle iron comprising upper and lower heating plates, separate heating elements for applying heat to said plates, electrical conductors between said plates, spaced hinge lugs mounted on said upper plate, spaced hinge lugs on the lower plate cooperating with those on said upper plate, means pivotally connecting said lugs, said lugs on said upper plate being provided in their outer faces with conduits terminating at one end at points adjacent said terminals for the upper heating element and at their other end in conduits connecting with the inner surfaces of said lugs, a conduit member between the said lugs on said upper plate connecting said conduits and provided with an aperture opening to the space between said lugs, said conductors being directed from said lower plate to said space and thence through said aperture and conduit member to and through the apertures and recesses in said lugs on said upper plate and thence to the terminals of the heating elements of said upper plate.

5. Cooking apparatus comprising a cooking plate, an electrical heating element carried by said plate, a base for said plate, a pair of spaced hinge lugs carried by said plate adjacent the terminals of said heating element, a pair of cooperating spaced hinge lugs carried by said base and received between said first lugs, a pin pivotally connecting said lugs, an electrical insulating sleeve surrounding said pin, each of said first lugs having a recess in its outer face, a second recess connecting one end of said recess with the inner face of said lug at a point adjacent one of said terminals, an aperture within said lug connecting the other end of said recess with the inner face of said lug and electric conductors directed between said lugs and coiled about said insulating sleeve and thence directed through said apertures and recesses to the terminals of said heating element.

6. A waffle iron comprising upper and lower opposed mold sections, an electrical heating element carried by each of said sections for heating said sections, each heating element having its terminal ends adjacent each other at one edge of its sections and the terminal ends of said elements being in the same relative position, hinge lugs carried by said upper section adjacent said terminals so as to receive said terminals between them, hinge lugs carried by said lower section and received between the said lugs on said upper section, a hinge pin pivotally connecting said hinge lugs whereby said mold sections can be rotated relatively to each other, each of said lugs of said upper section being provided with a recess in its outer face having one end terminating in a side of said lug adjacent said terminals and extending from said side to a point on the other side of said pivot pin adjacent the opposite edge of said lug, a recess on the side of said lug adjacent said upper section connecting the end of said first recess terminating in said side with the inner face of said lug, a transverse aperture through said lug connecting the other end of said recess with the inner surface of said lug, a pair of electric conductors between said heating elements directed from said lower plate between said spaced lugs where they are coiled about the central portion of said pin and means for directing said conductors in opposite directions from their coiled portions to said apertures through which they are passed to said recesses and through which they are directed to said terminals of said heating elements provided for said upper plate.

JACOB L. SHROYER.